United States Patent [19]
Chatterjee et al.

[11] Patent Number: 5,808,917
[45] Date of Patent: Sep. 15, 1998

[54] SYNTHESIS OF LOW POWER LINEAR DIGITAL SIGNAL PROCESSING CIRCUITS USING ACTIVITY METRICS

[75] Inventors: Abhijit Chatterjee, Atlanta, Ga.; Rabindra K. Roy, Plainsboro, N.J.

[73] Assignees: NEC USA, Inc.; Georgia Tech Research Corporation, both of Atlanta, Ga.

[21] Appl. No.: 818,084

[22] Filed: Mar. 14, 1997

Related U.S. Application Data

[63] Continuation of Ser. No. 228,122, Apr. 15, 1994, abandoned.

[51] Int. Cl.[6] ..................... G06F 9/455
[52] U.S. Cl. ................. 364/578; 364/488
[58] Field of Search .............. 364/578, 488, 364/489, 490, 491

[56] References Cited

U.S. PATENT DOCUMENTS

| | | | |
|---|---|---|---|
| 5,092,780 | 3/1992 | Vlach | 364/578 |
| 5,359,353 | 10/1994 | Djaja et al. | 364/489 |
| 5,459,673 | 10/1995 | Carmean et al. | 364/488 |
| 5,487,017 | 1/1996 | Prasad et al. | 364/488 |

OTHER PUBLICATIONS

Burch et al., McPower: A Monte Carlo Approach to Power Estimation, Aug. 1992, IEEE, pp. 90–97.
Chandrakasan et al, Hyper–LP: A System For Power Minimization Using Architectural Transformations, Aug. 1992, IEEE, pp. 300–303.
Chatterjee et al, Synthesis of Low Power Linear DSP Circuits Using Activity Metrics, Sep. 1994, IEEE, pp. 265–270.

*Primary Examiner*—Kevin J. Teska
*Assistant Examiner*—Matthew Clay Loppnow
*Attorney, Agent, or Firm*—Sughrue, Mion, Zinn, Macpeak & Seas, PLLC

[57] ABSTRACT

Low power linear digital signal processing circuits are fabricated based on a design synthesis process using activity metrics. The average activity value $\theta_i$ of all the input nodes of the circuit is determined. Architectural transformations of the circuit are performed in order to minimize the average activity value over all the nodes. The transformation resulting in the minimum activity value is the synthesized design used as the basis for fabricating a low power linear digital signal processing circuit.

20 Claims, 5 Drawing Sheets

5,808,917

SYNTHESIS OF LOW POWER LINEAR DIGITAL SIGNAL PROCESSING CIRCUITS USING ACTIVITY METRICS

This is a continuation of application Ser. No. 08/228,122 filed Apr. 15, 1994, now abandoned.

FIELD OF INVENTION

The present invention relates to a method of fabricating low power linear digital signal processing circuits based on a design synthesis process using activity metrics. Specifically, a data flow graph is derived which results in the minimum overall circuit activity value $\theta_i$ for the circuit comprising word-parallel and/or bit-serial arithmetic operations. The result is a circuit design with minimal power consumption which then forms the basis of a fabricated circuit.

BACKGROUND OF THE INVENTION

Circuit power requirements have become an increasingly important design parameter as a result of the increasing use of portable systems, such as personal communication and computing systems. Linear digital signal processing (DSP) circuits have found widespread application in these systems where it is well known that power consumption in CMOS digital circuits is directly related to node activity. In such circuits, power consumption is attributable to three major components: leakage current, short circuit current and switching current. Leakage current is typically much smaller than either of the other currents. Short circuit current can be minimized by the use of proper circuit design techniques. The power consumed due to switching of a CMOS gate with a load capacitance $C_L$ is given by $P=\eta(C_L * V_{dd}^2 * f)$ where $f$ is the clock frequency, $V_{dd}$ is the power supply voltage, and $\eta$ is the probability of a logic transition at the outputs of different gates of a digital circuit that determines the activity at the respective nodes of the circuit. Hence, node activity is directly related to the power consumed by a digital circuit.

Interest in circuit design with power as a design parameter has been on the rise. Recently, studies have been conducted of power optimization issues during various stages of CAD, eg. technology mapping, multilevel logic optimization and FSM synthesis. In the high level synthesis area studies have been made of architectural transformations (which preserve the circuit input-output relationship) for circuit optimization based upon area, speed, and power criteria.

SUMMARY OF THE INVENTION

The present invention identifies architectural transformations which minimize circuit activity measures without compromising hardware costs. Such an identification combined with low-power metrics of the type proposed in an article by A. Chandrakasan et al entitled "HYPER-LP: A System for Power Minimization Using Architectural Transformation" in Proc. Intl. Conf. Computer-Aided Design, pp 300–303, 1992, form the basis of a powerful ultra low power DSP synthesis method.

The present method does not make any assumption regarding gate-level implementations of adders and multipliers used in DSP synthesis. The method is based upon abstract functional models of DSP operations. In this regard, the methods are technology independent and must be analyzed at the hardware algorithm level. Moreover, the invention is not driven by accurate power estimation criteria since the invention is primarily concerned with determining if the overall power consumption increases or decreases as a result of an applied architectural transformation, without incurring a resulting high computation cost.

A principal object of the present invention is therefore, to provide of a method of synthesizing low power linear digital signal processing circuit using activity metrics.

A further object of the invention is the synthesis of low power linear digital signal processing circuits using the average activity $\theta_i$ at each node and the capacitive load $C_i$ at each node as cost metrics, the sum of which is to be minimized.

Another object of the invention is to provide fabrication of a low power linear digital signal processing circuit using the design synthesized in accordance with the present invention.

Further and still other objects of the present invention will become more clearly apparent when the following description is read in conjunction with the accompanying drawings.

DETAILED DESCRIPTION OF THE INVENTION

Figure 1:
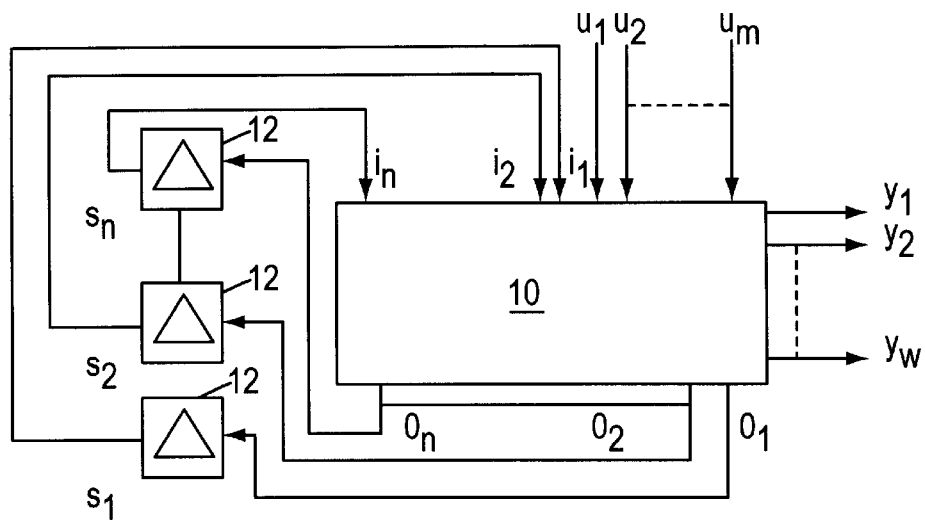
FIG. 1 is a schematic diagram of a linear digital circuit model.

Referring now to the figures and to FIG. 1 in particular, there is shown a schematic diagram of a linear digital circuit.

Circuitry in box 10 computes a linear transform of its (n+m) inputs and generates (n+w) outputs as shown. At time t, data words corresponding to the circuit states (outputs of memory elements 12) $s_1(t), s_2(t), \ldots, s_n(t)$ and the inputs $u_1(t), u_2(t), \ldots, u_m(t)$ are fed to box 10, which in turn generates the outputs $y_1(t), y_2(t), \ldots, y_w(t)$ and the circuit next states $s_1(t+1), s_2(t+1), \ldots, s_n(t+1)$. The operation of the circuit can be represented mathematically by a system of equations given by $Y(t+1)^T = MX(t)^T$, where $X(t)=[s_1(t), s_2(t), \ldots, s_n(t), u_1(t), u_2(t), \ldots, u_m(t)]$ and $Y(t+1)=[s_1(t+1),$ $s_2(t+1), \ldots, s_n(t+1), y_1(t+1), y_2(t+1), \ldots, y_w(t+1)$].
Consider the expression for $s_i(t+1)$ given by Equation (1).

$$s_i(t+1) = \sum_{j=1}^{j=n} m_{ij}s_j(t) + \sum_{j=n+1}^{j=m} m_{ij}u_j(t) \quad (1)$$

This equation can be implemented by first performing the multiplications $m_{ij}s_j(t)$ and $m_{ij}u_j(t)$ and then adding the results using an adder tree. Such a circuit, as shown in FIG. 1, is referred to as the computation tree for $s_i(t+1)$. In general, there will exist (n+w) such computation trees in box 10. For logic minimization purposes, the values obtained at intermediate nodes of these trees can be shared by one or more computation trees.

Figure 2:
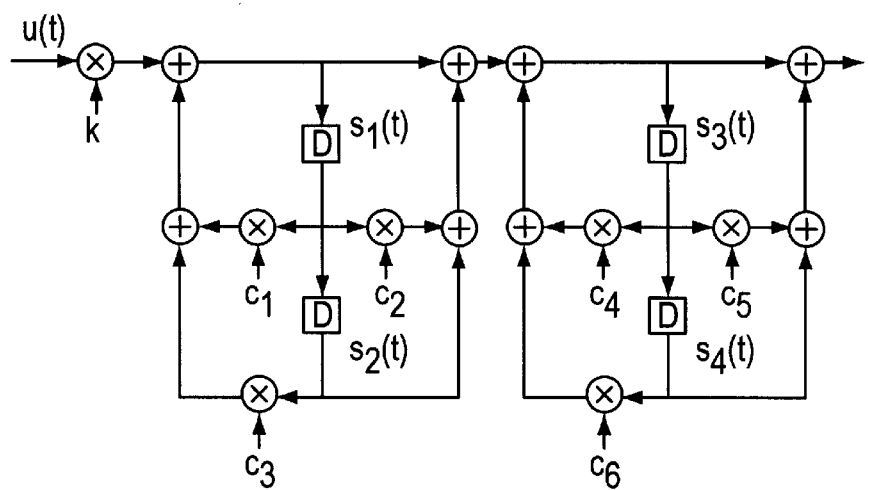
FIG. 2 is a data flow graph of an IIR Filter.

In order to understand the invention, consider the data flow graph of an IIR filter shown in FIG. 2, which can be described by the equation.

$$\begin{bmatrix} s_1(t+1) \\ s_2(t+1) \\ s_3(t+1) \\ s_4(t+1) \end{bmatrix} = \begin{bmatrix} c_1 & c_3 & 0 & 0 & k \\ 1 & 0 & 0 & 0 & 0 \\ (c_1+c_2) & (1+c_3) & c_4 & c_6 & k \\ 0 & 0 & 1 & 0 & 0 \end{bmatrix} \begin{bmatrix} s_1(t) \\ s_2(t) \\ s_3(t) \\ s_4(t) \\ u(t) \end{bmatrix}$$

The computation tree for $s_1(t+1)$ for example, is described by the equation $s_1(t+1)=c_1s_1(t)+c_3s_2(t)+ku(t)$.

The filter of FIG. 2 can be implemented using either word-parallel or bit-serial arithmetic. In the word-parallel case, each signal (arc) of the data flow graph of FIG. 2 represents W bits of data comprising a data word. The W bits $b_W, b_{W-1}, \ldots, b_0$ are fed in parallel to the respective adders and multipliers shown in FIG. 2. The delays are designed to hold W bits of data in parallel. At time t+1, let z out of W bits have different logic values than at time t. The ratio $\beta(t)=z/W$ is defined to be the signal activity at time t. The variable $\beta(t)$ is a random variable for different values of t and represents a stochastic process. The average activity $\theta(t,t+N)$ of a signal over N consecutive time frames is defined as in Equation (2).

$$\theta(t,t+N) = 1/N \sum_{i=t}^{i=t+N} \beta(i) \quad (2)$$

Figure 3:
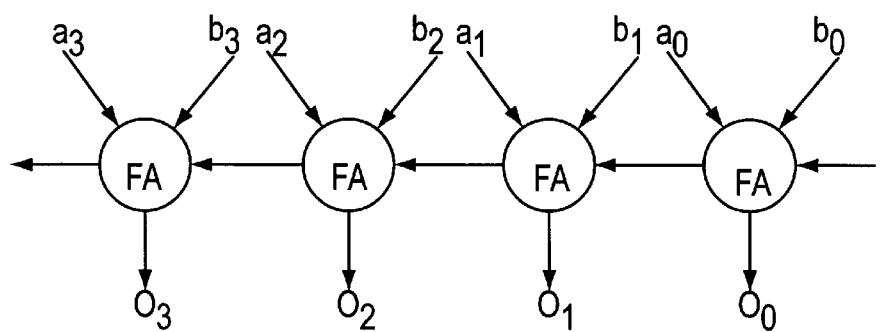
FIG. 3 is a schematic representation of a four-bit parallel adder.

For example, consider the four-bit parallel adder shown in FIG. 3, where FA represents a combinational full adder. Let the inputs be $A=a_3a_2a_1a_0=0101$ and $B=b_3b_2b_1b_0=1010$ and output $o_3o_2o_1o_0=1111$ at time t. If the input A changes to A=0001, then at time t+1, the output becomes 1011. Hence the output activity is given by $\beta(t)=\frac{1}{4}$.

Figure 4:
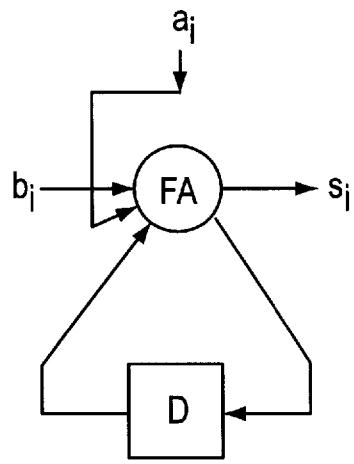
FIG. 4 is a schematic representation of a bit-serial adder.

In the case of bit-serial arithmetic, the bit values of a data word are transmitted serially over a single data line over consecutive time steps. As an example, consider the bit-serial adder shown in FIG. 4. Initially, the FA value is set to logic '0'. To add A=0001 to B=1010, the sequence $a_i b_i=10$, 01, 00 and 01 is fed to the adder. The output sequence $s_i=1$, 1, 0, 1 is obtained (least significant bit first). Let there be z transitions of the (single) data line per data word processed. The signal activity for bit-serial arithmetic is defined to be $\beta(t)=z/(W-1)$ and is given by $\frac{2}{3}$ for the above example. As before, $\beta(t)$ is a random variable and represents a stochastic process. The average activity $\theta(t,t+N)$ is given by the same expression as for the word-parallel case except that $\beta(t)$ is defined as above. The particular definitions of $\beta(t)$ for word-parallel and bit-serial arithmetic are chosen to reflect the activities on the inputs of logic implementations corresponding to the two DSP implementation technologies. The invention is applicable to both word-parallel and bit-serial arithmetic implementations.

The stochastic process $\beta(t)$ has rational values between 0 and 1. Due to the fact that the digital circuits being considered are linear time-invariant, this stochastic process is strict sense stationary (one whose statistical properties are invariant to a shift of the time origin). Also assume that this stochastic process is mean-ergodic, i.e., that $\beta(t)$ and $\beta(t+\tau)$ become uncorrelated for $\tau\to\infty$. Table 1 shows the average activity $\theta(0, N)$ of the output of the filter in FIG. 2 for different values of N in word-parallel and bit-serial arithmetic. Table 1 indicates that the mean of the stochastic process is almost constant, independent of time. While the filter in FIG. 2 has a single input, in general it is assumed that stochastic processes at the circuit inputs are mutually independent. Moreover, the strict sense stationary assumption is here shown experimentally to be valid for general sequential circuits of the type shown in FIG. 1. Since the processes at the circuit outputs are strict sense stationary, so are the processes at all the internal data flow graph nodes. Table 2 shows the values of $\theta(0, N)$ for $N\gg0$ corresponding to the multiplier outputs of the IIR filter in FIG. 2 (input values to the filter are randomly generated data words).

TABLE 1

Average Output Activity

| N | Bit serial $\theta$ | Word parallel $\theta$ |
|---|---|---|
| 1000 | 0.512916 | 0.359360 |
| 5000 | 0.513529 | 0.354571 |
| 10000 | 0.513471 | 0.353873 |
| 15000 | 0.514652 | 0.355499 |
| 20000 | 0.514911 | 0.355618 |

TABLE 2

Average Activities at Multiplier Outputs.

| Multiplier | constant | $\theta$ |
|---|---|---|
| $c_1$ | 0.2855823838 | 0.254827 |
| $c_2$ | 0.4512591755 | 0.275021 |
| $c_3$ | −0.9116860618 | 0.308087 |
| $c_4$ | 0.4457342317 | 0.348118 |
| $c_5$ | −0.99999999 | 0.384857 |
| $c_6$ | −0.913078673 | 0.381570 |

In low power design, the transformations described below are based on the properties of associativity and commutativity of linear operations. The method used is to minimize the cost $\Sigma_{i=1}^{i=\gamma}\theta_i(0, N)*C_i$, where $\theta_i$ is the average activity at node i (out of $\gamma$ such nodes) and $C_i$ is the capacitive load on the i'th node. Under the simplifying assumption that the capacitive loads on all the nodes are similar, this reduces to the problem of minimizing the average value of $\theta_i$ over all the circuit nodes. As noted above, the stochastic processes at the internal nodes of the circuit data flow graph are also strict-sense stationary. Since the behavior of the circuitry in box 10 is uniquely specified by the matrix M, it follows that the average activity $\theta_i$ for a specified input is independent of the implementation of the circuitry and depends only on the specification of M. This allows the use of the following procedure for low-power design.

First, by simulation methods, determine the average activities $\theta_i$ of all the inputs to the circuitry in box 10 in FIG. 1.

Second, use architectural transformations on the implementation of the circuitry in box 10 to minimize the average value of $\theta_i$ over all its nodes.

In order to determine how the data flow graph of the circuitry in box 10 should be transformed, it is necessary to study how node activity at the output of a constant multiplier is affected when the constant value is changed and how the activity at the output of an adder is affected by a change in the activity of either of its inputs.

Figure 5:
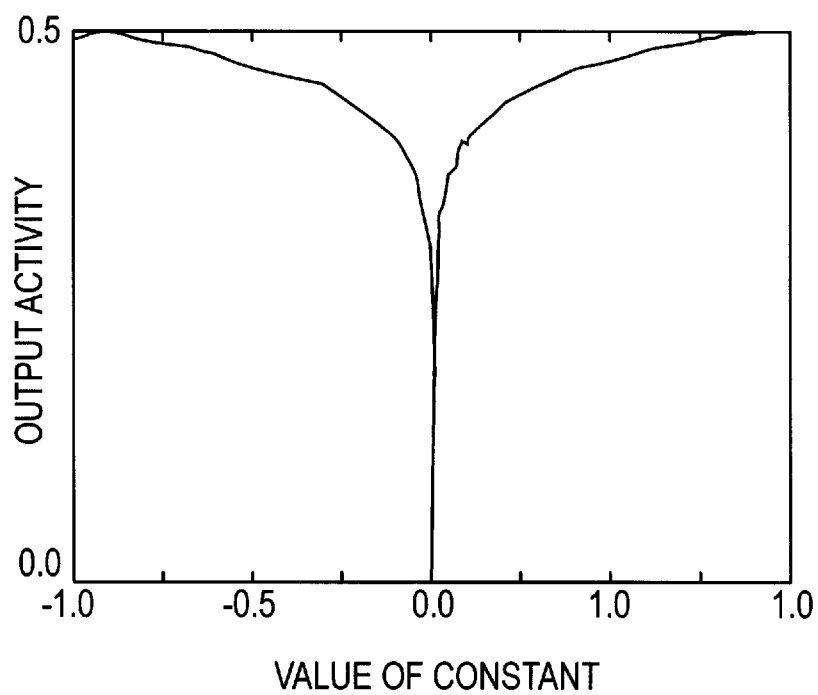
FIG. 5 is a graphical representation of the activity at the output of a bit-parallel multiplier as a function of the value of the multiplier constant.

In measuring the activity of constant multipliers, consider a multiplier that multiplies W-bit data words by a W-bit binary constant. First consider the case of word-parallel multiplication. It is assumed that all the operands are normalized to lie between +1.0 and −1.0. For a given constant value, the data input of the multiplier is simulated with random inputs with average activity $\theta=0.5$. The number of patterns used for simulation was 20,000. FIG. 5 shows a graphical plot of the activity at the output of the multiplier versus the value of the multiplier constant, in the range −1.0 to +1.0. Negative numbers were represented using two's complement arithmetic.

As is seen from the graph in FIG. 5, the average activity at the output of the multiplier monotonically increases with the absolute value of the multiplier constant. The observed behavior can be explained as follows. A constant multiplier maps input X to output Y, given by $Y=\alpha^* X$, where $-1 \leq \alpha \leq 1$. Since Y and X are both W-bit wide, the $2^W$ values of X for $-1 \leq X \leq 1$, are mapped onto values of Y in the range $-\alpha \leq Y \leq \alpha$. Since $|\alpha|<1$, this mapping is many-to-one. The smaller the value of $\alpha$, the larger the number of data values of X that are mapped to a single output value of Y. This causes the average activity of the output Y to drop off gradually with decreasing values of $\alpha$.

Figure 6:
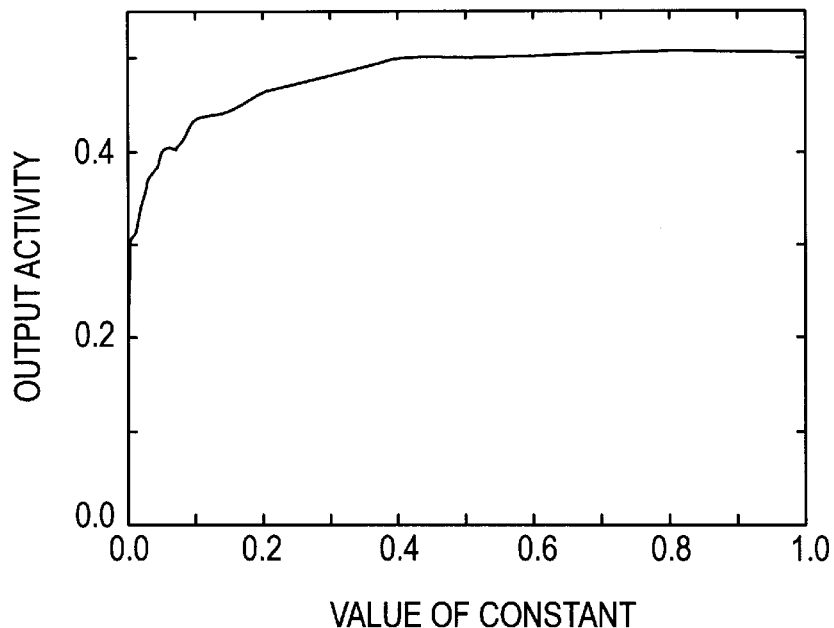
FIG. 6 is a graphical representation of the activity at the output of a bit-serial multiplier as a function of the value of the multiplier constant.

The above experiment was repeated for the case of bit-serial multiplication. The results of the simulation for $0 \leq \alpha \leq 1$, are shown in FIG. 6. The graph for $-1 \leq \alpha \leq 0$ is a mirror image about the y-axis of the graph of FIG. 6, and is not shown. The major difference between the graphs of FIGS. 5 and 6 is that in FIG. 6, the average output activity saturates to 0.5 for values of $\alpha>0.5$ (due to intra-word activity).

In measuring the activity of adders, consider the addition $Z=X+Y$. Let the average activities of the input X and Y be $\theta_X$ and $\theta_Y$, respectively. Experiments to measure the average activity of the output $\theta_Z$ for a given value of $\theta_X$ and different values of $\theta_Y$ were conducted. The experimental arrangement used to perform the measurements is shown in FIG. 7.

Figure 7:
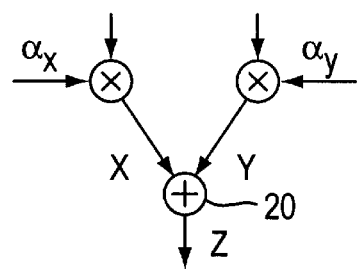
FIG. 7 is a schematic representation of the arrangement used to perform activity measurements of an adder.
Figure 8:
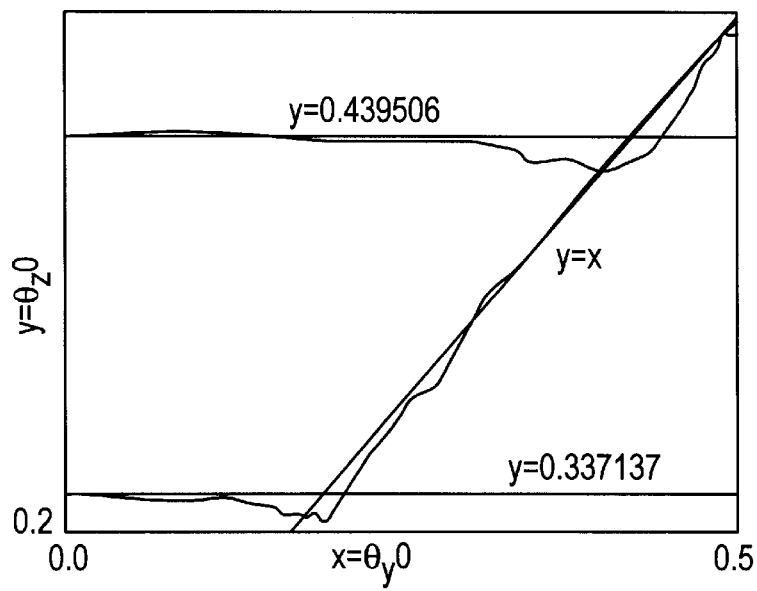
FIG. 8 is a graphical representation of activity experiments performed using word-parallel addition.
Figure 9:
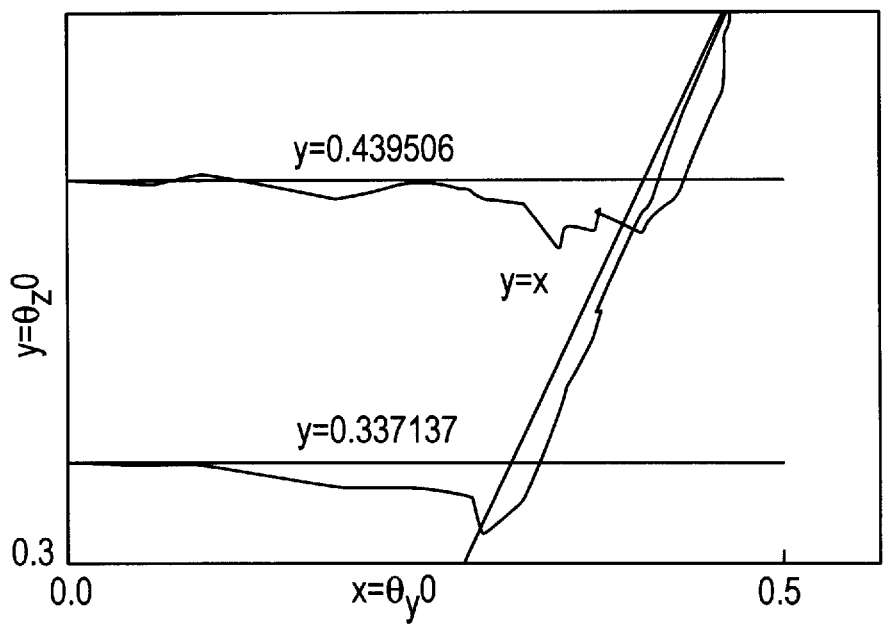
FIG. 9 is a graphical representation of activity experiments performed using bit-serial addition.

In FIG. 7, the selection of the constant $\alpha_X$ is used to create a stochastic process at the input X of the adder 20 with average activity $\theta_X$. For a predetermined value of $\alpha_X$, and thereby $\theta_X$, the average activity $\theta_Z$ is tabulated for different values of $\theta_Y$. FIG. 8 graphically illustrates the results of two experiments performed using word-parallel addition for $\theta_X=0.337137$ and $\theta_X=0.439506$. The asymptotes $y=0.337137$ and $y=0.439506$ as well as line $y=x$ are shown in the graph. The y-axis corresponds to the average activity $\theta_Z$ at the output of the adder while the x-axis corresponds to the average activity $\theta_Y$. An identical experiment was performed for bit-serial addition and the results are shown in FIG. 9.

TABLE 3

Validation of the Max Hypothesis

| Adder no. | in1 activity | in2 activity | max activity | output activity |
|---|---|---|---|---|
| 1 | 0.272694 | 0.308450 | 0.308450 | 0.313231 |
| 2 | 0.313231 | 0.317222 | 0.317222 | 0.304119 |
| 3 | 0.304119 | 0.381659 | 0.381659 | 0.384963 |
| 4 | 0.384963 | 0.393405 | 0.393405 | 0.360739 |
| 5 | 0.308087 | 0.254827 | 0.308087 | 0.308450 |

TABLE 3-continued

Validation of the Max Hypothesis

| Adder no. | in1 activity | in2 activity | max activity | output activity |
|---|---|---|---|---|
| 6 | 0.275021 | 0.313207 | 0.313207 | 0.317222 |
| 7 | 0.348118 | 0.381570 | 0.381570 | 0.381659 |
| 8 | 0.384857 | 0.384930 | 0.384930 | 0.393405 |

In both of the above experiments the stochastic processes at the two adder inputs are mutually independent and uncorrelated. Under this assumption the following conclusion (hereby referred to as the max hypothesis) is reached from analysis of FIGS. 8 and 9.

For word-parallel and bit-serial arithmetic, the average activity $\theta_Z$ at the output of the adder of FIG. 7 can be closely approximated by $\theta_Z=\max(\theta_X, \theta_Y)$. This result, although derived for uncorrelated inputs, was found to be applicable with reasonable accuracy to cases of correlated inputs due to reconvergent fanout and sequential feedback. The result can be applied to linear digital circuits since these circuits contain only constant multipliers and adders. Table 3 shows average activity values at the inputs and outputs of all the adders of the IIR filter in FIG. 2 under sinusoidal input stimulation. The adders are numbered row-wise from left to right, starting with upper left corner. Hence, the max hypothesis is quite accurate under practical conditions which include signal correlation effects.

Figure 10:
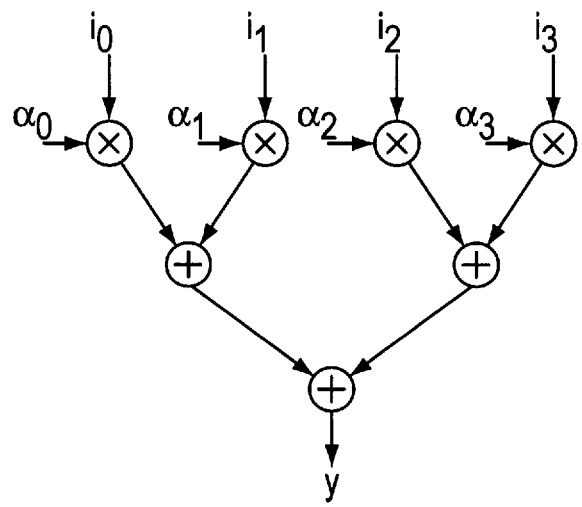
FIG. 10 is a schematic diagram of a balanced computation line for l=2.

In order to perform synthesis for low power circuit design, consider a word-parallel computation tree with I inputs $i_1$, $i_2, \ldots, i_I$ and output $y=\Sum_{j=o}^{j=I}\alpha_j i_j, \alpha_j$ being rational constants. Assume that all operations are pipelined. For simplicity, let $I = 2^l-1$, where l is the number of levels in a perfectly balanced adder tree. FIG. 10 shows such a tree for l=2. If the input values to the tree are assumed to be mutually independent and uncorrelated, then the following result is obtained for word-parallel as well as bit-serial circuits the minimum average value of $\theta_i$ over all the nodes of a balanced adder tree with I inputs is obtained when (a) $\alpha_0 \geq \alpha_1 \geq \ldots \geq \alpha_I$ or (b) $\alpha_0 \geq \alpha_1 \geq \ldots \geq \alpha_I$. That is, the value of $\alpha_j$ monotonically increases or decreases in order of addition for minimum power requirement.

The result for Case (a) is proved by showing that any other ordering of the constants $\alpha_i$ will cause the average activity to increase as follows. From the graphs of FIGS. 5 and 6, it is clear that $\theta_0>\theta_1> \ldots >\theta_I$, where $\theta_j$ is the average activity at the output of the multiplier corresponding to $\alpha_j$. Consider two adders at the topmost level of the adder tree, the first with inputs $\alpha_p^* i_p$ and $\alpha_q^* i_q$, and the second with inputs $\alpha_r^* i_r$ and $\alpha_s^* i_s$, such that $\alpha_p>\alpha_q>\alpha_r>\alpha_s$. If $\alpha_q$ and $\alpha_r$ are interchanged, then the average activity at the output of the first adder will still be proportional to $\alpha_p$ due to the max hypothesis. However, the average activity at the output of the second adder will increase from $\alpha_r$ to $\alpha_q$.

Figure 11:
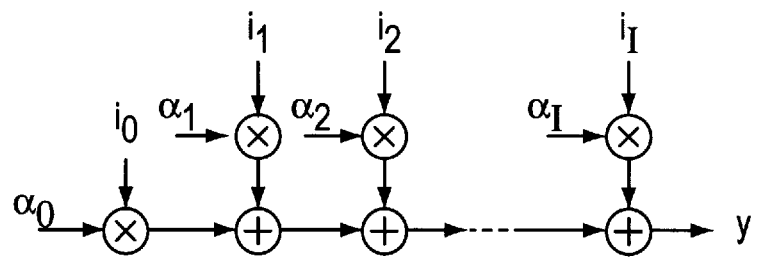
FIG. 11 is a schematic diagram of a pipelined bit-serial array of adders.

The proof for Case (b) is obtained by symmetry. The worst case assignment of constants to multipliers, that maximizes average $\theta_i$, occurs when $\alpha_0 \geq \alpha_2 \geq \alpha_4 \geq \alpha_6 \ldots \geq \alpha_1 \geq \alpha_3 \geq \alpha_5 \ldots \geq \alpha_I$. The above results can be trivially extended to adder trees that are not perfectly balanced. The following result is based on the max hypothesis that the minimum average value of $\theta_i$ over all the nodes of a computation tree is achieved by a pipelined/bit-serial array of adders as in FIG. 11 for which $\alpha_0 \leq \alpha_1 \leq \alpha_2 \leq \ldots \leq \alpha_I$.

Figure 12:
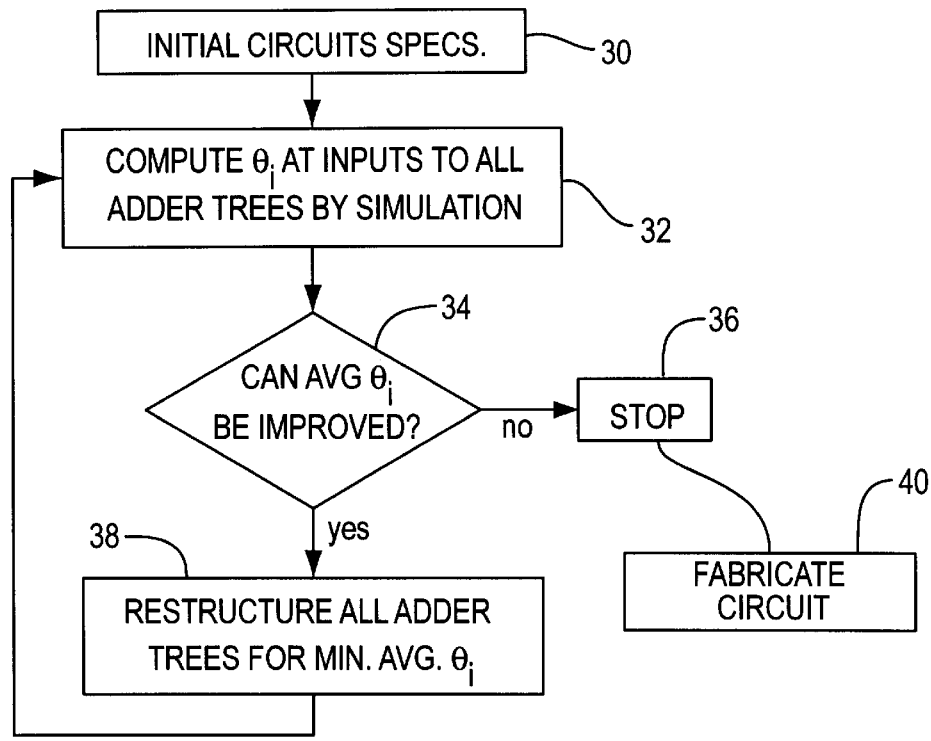
FIG. 12 is a preferred algorithm for low-power synthesis design.

The synthesis algorithm is simulation-based and proceeds as shown in FIG. 12. The initial circuit specifications are defined 30 including deriving a data flow graph. The average activity $\theta_i$ at each node i at the input to all the adder trees is computed 32 by simulation. The given circuit is simulated at the functional level with random, mutually independent circuit input values. The preferred simulation method is based on a Monte-Carlo power estimation technique proposed in Burch et al, "McPower: A Monte Carlo Approach to Power Estimation" in Proc. Euro. Des.-Autom Conf., pp 90 to 97, 1992.

The present invention uses simplifying heuristics to speed up the simulation process. The underlying measurements of $\theta_i$ are very accurate and have been validated by simulations over large sampling periods. From the above measurements, the activities at the inputs to all adder trees are noted. By applying the max hypothesis, the adder trees are restructured as discussed earlier and average activities recomputed. The procedure forces additions with high activity to be moved closer to the root of a computation tree and vice versa.

A decision is then made 34 whether the average activity value $\theta_i$ can be minimized, i.e. improved. The decision is made by determining whether $\alpha_j$ monotonically increases or monotonically decreases. If the activity value cannot be improved, the process is terminated 36 and the design synthesis is completed. If the activity value can be minimized, all of the adder trees are restructured 38 to improve the minimum average activity value $\theta_i$. The restructured tree configuration is provided to recompute the average activity value 32 and the process repeats until it is decided 34 that the average activity value cannot be further minimized, at which time the process stops 36 and the design synthesis is complete After the design synthesis is stopped 36, a circuit is fabricated 40 based on the synthesized design. The circuit comprises either word-parallel or bit-serial arithmetic devices, the fabrication of which forms a combinational logic circuit and is well known in the art.

Figure 13:
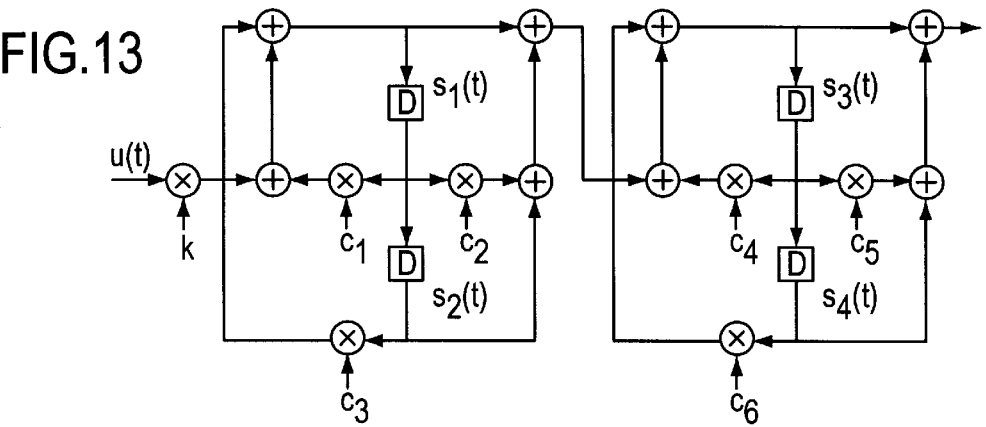
FIG. 13 is a is a data flow graph of an IIR filter based on a design having the lowest average value of $\theta_i$.
Figure 14:
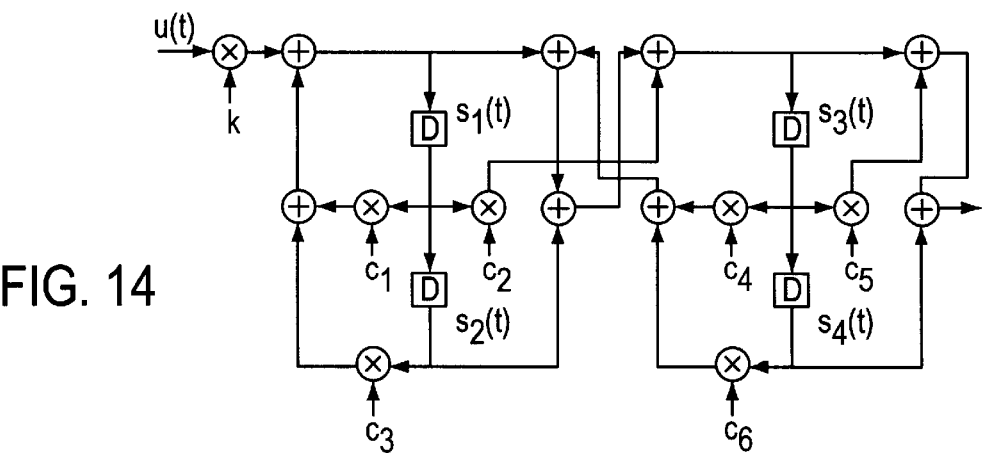
FIG. 14 is a data flow graph of an IIR filter based on a design having the largest average value of $\theta_i$.

The optimization algorithm was applied to several practical circuits and the decrease in the average value of $\theta_i$ over all the circuit nodes was measured. This is a close approximation to the power consumption savings as other factors such as node capacitance and power supply voltage were left unchanged by the data flow graph transformations. It was assumed that word-parallel implementations were pipelined and that the outputs of parallel adders and multipliers were clocked into data registers. FIG. 13 shows the transformed data flow graph of the IIR filter in FIG. 2 corresponding to the lowest average value of $\theta_i$ over all the circuit nodes. For comparison, the worst-case data flow graph for the same IIR filter in FIG. 2 is shown in FIG. 14 (with the largest average value of $\theta_i$).

The synthesis procedure of FIG. 12 uses random input values for circuit simulation. Experiments were conducted to validate the conclusions for other input waveforms. Table 4 shows results obtained on several test circuits. For each circuit, measurements of average $\theta_i$ were made for the best-case and worst-case data flow graph transformations for both word-parallel (WP) as well as bit-serial (BS) implementations. For each circuit, a measurement was made of how well it performed with other types of stimuli: random, sinusoidal (Sin), and speech input (Audio 1 and Audio 2) waveforms. Among the four circuits considered, CKT1 and CKT2 are two elliptic filters, CKT3 is a control circuit and CKT4 is an IIR filter. In Table 4, WC and BC stand for the average values of $\theta_i$ for the worst-case and best-case data flow graphs. The last column is a measure of the power savings possible. From Table 4, it is clear that the data flow graph transformations made by the synthesis procedure of the present invention perform equally well for different input signals.

TABLE 4

Synthesis Results.

| Ckt name | Stimulus | Arithmetic | WC | BC | % difference |
|---|---|---|---|---|---|
| CKT1 | Sin | WP | 0.258766 | 0.251816 | 3% |
| CKT1 | Sin | BS | 0.309335 | 0.301768 | 3% |
| CKT1 | Audio1 | WP | 0.187481 | 0.180840 | 4% |
| CKT1 | Audio1 | BS | 0.427692 | 0.420392 | 2% |
| CKT1 | Audio2 | WP | 0.173532 | 0.166943 | 4% |
| CKT1 | Audio2 | BS | 0.426765 | 0.4149476 | 2% |
| CKT2 | Random | WP | 0.242173 | 0.200467 | 21% |
| CKT2 | Random | BS | 0.301690 | 0.273232 | 10% |
| CKT2 | Sin | WP | 0.315967 | 0.283371 | 23% |
| CKT2 | Sin | BS | 0.315967 | 0.283371 | 12% |
| CKT2 | Audio1 | WP | 0.177544 | 0.137931 | 22% |
| CKT2 | Audio1 | BS | 0.388835 | 0.345016 | 11% |
| CKT2 | Audio2 | WP | 0.163238 | 0.123954 | 24% |
| CKT2 | Audio2 | BS | 0.387918 | 0.344143 | 11% |
| CKT3 | Random | WP | 0.429776 | 0.414485 | 4% |
| CKT3 | Random | BS | 0.403163 | 0.3919178 | 4% |
| CKT3 | Sin | WP | 0.392445 | 0.382565 | 3% |
| CKT3 | Sin | BS | 0.399348 | 0.390581 | 2% |
| CKT3 | Audio1 | WP | 0.342524 | 0.329798 | 4% |
| CKT3 | Audio1 | BS | 0.490170 | 0.478276 | 2% |
| CKT3 | Audio2 | WP | 0.323641 | 0.310799 | 4% |
| CKT3 | Audio2 | BS | 0.488263 | 0.475241 | 3% |
| IIR2 | Random | WP | 0.342432 | 0.331822 | 3% |
| IIR2 | Random | BS | 0.513006 | 0.502194 | 2% |
| IIR2 | Audio1 | WP | 0.283541 | 0.272659 | 4% |
| IIR2 | Audio1 | BS | 0.454018 | 0.442747 | 2% |

The present invention provides a new synthesis procedure for low power linear DSP circuits. The activity effects in adders and multipliers is used to derive optimal designs of computation trees of linear circuits from which a method for designing low-power linear sequential circuits is developed. The method uses the knowledge that the stochastic activity process is strict-sense stationary.

While there has been described and illustrated a preferred a method of synthesizing low power linear DSP circuits, it will be apparent to those skilled in the art that variations and modifications are possible without deviating from the spirit and broad principles of the present invention which shall be limited solely by the scope of the claims appended hereto.

What is claimed is:

1. A method of synthesizing a low power linear digital signal processing circuit comprising the steps of;
    (a) defining initial circuit specifications;
    (b) computing the average activity value $\theta_i$ at the node i for each input of the circuit;
        wherein said average activity value is derived by averaging the result of a stochastic process representative of potential changes in the state of said node over a finite number of consecutive time frames;
    (c) determining if the computed average activity value is the minimum value,
        (i) if the computed average activity value is not the minimum value, transforming the circuit to minimize the average activity value and return to step (b),
        (ii) if the computed average activity value is the minimum value, selecting the circuit used for computing the minimum value $\theta_i$ as a synthesized design; and
    (d) synthesizing a low power linear digital signal processing circuit based on said synthesized design.

2. A method of synthesizing a low power linear digital signal processing circuit as set forth in claim 1 where said computing the average activity value $\theta_i$ at node i is performed by minimizing the value $\Sigma_{i=1}^{i=\gamma}\theta_i(0,N)*C_i$, where $\gamma$ is the total number of nodes, N is the total number of said consecutive time frames and $C_i$ is the capacitive load on the ith node.

3. A method of synthesizing a low power linear digital signal processing circuit as set forth in claim 2, where said determining step is performed by further determining whether multiplier constants $\alpha_j$ monotonically increase or monotonically decrease in order of addition.

4. A method of fabricating a low power linear digital signal processing circuit as set forth in claim 3, where said synthesized design comprises word-parallel arithmetic devices.

5. A method of fabricating a low power linear digital signal processing circuit as set forth in claim 3, where said synthesized design comprises bit-serial arithmetic devices.

6. A method of synthesizing a low power linear digital signal processing circuit as set forth in claim 1, where said determining step is performed by further determining whether multiplier constants $\alpha_i$ monotonically increase or monotonically decrease in order of addition.

7. A method of fabricating a low power linear digital signal processing circuit as set forth in claim 1, where said defining initial circuit specifications is in terms of multipliers and adder trees.

8. A method of fabricating a low power linear digital signal processing circuit as set forth in claim 7, where said computing is performed by simulation.

9. A method of synthesizing a low power linear digital signal processing circuit as set forth in claim 7, where said transforming the circuit comprises restructuring the tree configuration.

10. A method of fabricating a low power linear digital signal processing circuit as set forth in claim 1, where said defining initial circuit specification is in terms of a data flow graph.

11. A method of synthesizing a low power linear digital signal processing circuit as set forth in claim 10, where said transforming the circuit comprises architectural transformation.

12. A method of fabricating a low power linear digital signal processing circuit as set forth in claim 1, where said synthesized design comprises word-parallel arithmetic devices.

13. A method of fabricating a low power linear digital signal processing circuit as set forth in claim 1, where said synthesized design comprises bit-serial arithmetic devices.

14. A low power linear digital signal processing circuit fabricated in accordance with the method as set forth in claim 1.

15. A low power linear digital signal processing circuit fabricated in accordance with the method as set forth in claim 2.

16. A low power linear digital signal processing circuit fabricated in accordance with the method as set forth in claim 3.

17. A low power linear digital signal processing circuit fabricated in accordance with the method as set forth in claim 4.

18. A low power linear digital signal processing circuit fabricated in accordance with the method as set forth in claim 5.

19. A low power linear digital signal processing circuit fabricated in accordance with the method as set forth in claim 12.

20. A low power linear digital signal processing circuit fabricated in accordance with the method as set forth in claim 13.

* * * * *

UNITED STATES PATENT AND TRADEMARK OFFICE
CERTIFICATE OF CORRECTION

PATENT NO.  : 5,808,917
DATED       : September 15, 1998
INVENTOR(S) : Abhijit CHATTERJEE and Rabindra K. ROY It is certified that error appears in the above-identified patent and that said Letters Patent is hereby corrected as shown below:

On the title page item [54],
In the Title, please delete "SIGNAL".

Column 2, line 5, delete "of".

Column 4, line 47, please delete "$\sum_{i=1}^{i=\gamma}\theta$" and insert -- $\sum_{i=1}^{i=\gamma}\theta$ --. (first occurrence)

Column 6, line 32, delete "$\sum_{j=0}^{j=I}\alpha$" and insert -- $\sum_{j=0}^{j=I}\alpha$ --.

Column 8, line 64, please delete "$\sum_{i=1}^{i=\gamma}\theta$" and insert -- $\sum_{i=1}^{i=\gamma}\theta$ --.

Column 9, line 5, delete "fabricating" and insert --synthesizing--;

Column 9, line 9, delete "fabricating" and insert --synthesizing--;

Column 9, line 17, delete "fabricating" and insert --synthesizing--;

Column 9, line 19, delete "definining" and insert --defining--;

Column 9, line 20, delete "fabricating" and insert --synthesizing--; and

Column 9, line 27, delete "fabricating" and insert --synthesizing--.

UNITED STATES PATENT AND TRADEMARK OFFICE
CERTIFICATE OF CORRECTION

PATENT NO. : 5,808,917
DATED : September 15, 1998
INVENTOR(S) : Abhijit CHATTERJEE and Rabindra K. ROY It is certified that error appears in the above-identified patent and that said Letters Patent is hereby corrected as shown below:

Column 10, line 1, delete "fabricating" and insert --synthesizing--; and

Column 10, line 5, delete "fabricating" and insert --synthesizing--.

Signed and Sealed this

Fourteenth Day of September, 1999

Attest:

Q. TODD DICKINSON

*Attesting Officer*      *Acting Commissioner of Patents and Trademarks*